Patented July 8, 1947

2,423,686

UNITED STATES PATENT OFFICE 2,423,686

SILICEOUS CONTACT MATERIAL AND PROCESS OF MANUFACTURE

Arthur B. Cummins, Plainfield, N. J., assignor to Johns-Manville Corporation, New York, N. Y., a corporation of New York No Drawing. Application October 8, 1942, Serial No. 461,315

7 Claims. (Cl. 252—235)

This invention relates to contact materials for promoting chemical reactions such as, for example, oxidation and dehydrogenation reactions. The invention is more particularly concerned with the production of siliceous granules having a physical structure and a chemical composition particularly adapted for use as such a contact material.

Chemical reactions of the type referred to are generally carried out by causing the reactants to flow in a fluid stream through a stationary mass or bed of the contact material. Frequently the contact material becomes rapidly contaminated with carbon or other undesired by-products of the main reaction, and it is necessary to suspend the reaction and to regenerate the contact material or catalyst, as by means of high temperature oxidation or combustion treatment. A suitable contact material or catalyst support for this type of reaction must have substantial hardness and physical strength in order to withstand frequent handling and in order to support an overburden of material in a bed or mass without dusting or disintegration or crushing. Such material must also have a comparatively porous structure, or low density, because the denser the material, the less its suitability as a catalyst or catalyst support, due to the reduced contact surface presented to the reactant fluids.

An object of the invention is to provide a process whereby finely-divided diatomaceous earth may be agglomerated into spherular granules which are sufficiently strong and hard to resist crushing when assembled into deep masses or beds, and which are of sufficient size and porosity to provide a mass or bed of contact material which is readily permeable to flow of fluids therethrough.

Use of diatomaceous earth and agglomerated particles thereof as contact materials and catalyst carriers may develop difficulties because of rapid deterioration of the catalyst activity even despite frequent regenerations as by oxidation. However, when aggregate granules are manufactured in accordance with the process of the present invention, from finely-divided diatomaceous earth particles of which the silica content exceeds 84%, and in which the non-siliceous impurities (such as alumina, ferric oxide, calcium and magnesia oxides) and added fluxing agents comprise less than 16% of the mixture, agglomerate granules can be made which will retain a high degree of catalytic activity and physical strength over a long period, whether or not they are subjected to frequent high-temperature regeneration treatments.

Another object of the present invention is to provide a method of calcining and agglomerating diatomaceous earth particles having associated therewith comparatively small amounts of non-siliceous impurities including added fluxing agents, in such a way as to effect agglomeration of the particles into spherular granules without appreciable reduction or disintegration of the porous diatom structure and without substantial coating over of the particle surfaces with fused non-siliceous impurities.

The discovery which forms the subject of the present invention is that a very finely-divided diatomaceous earth of relatively high silica content can be agglomerated with a small proportion of a fluxing agent by calcining at high temperatures (above 2000° F.) and under controlled conditions of feed and agitation through the calcining zone, into spherular granules which are so hard, strong, and resistant to high temperatures and at the same time of such size (above $\frac{1}{20}$" minimum diameter) and of such high porosity, as to particularly adapt such granular product for use as a contact material and catalyst support. The subject of the present invention is a modification of and improvement on that described in my prior United States Patent No. 1,970,280 granted August 14, 1934, for "Siliceous product and process of making the same."

By the process of my afore-mentioned patent, very finely-divided diatomaceous earth of "bag house" grade is calcined with a small amount of flux in a rotary kiln at a temperature of about 1800° F. under conditions wherein the charge material is subjected to mild agitation by tumbling while maintained for about ½ hour in a comparatively deep bed providing close and continuous contact of the individual particles, whereby sintering and fritting together of particles is effected in the calcining zone. The granular product of such treatment is a practically white porous spherular aggregate of an average particle size much smaller than .20" diameter and having a loose bulk density of about 20 lbs. per cubic foot. By the process of the present invention "bag house" grade diatomaceous earth of suitable purity may be flux-calcined in a rotary kiln at a much higher temperature than heretofore employed without substantial destruction of the porous diatom structure while agglomerating the particles into spherular granules of much higher crushing strength and of much larger size by an operation in which the charge material is subjected in a comparatively thin bed for a relatively much shorter period to an intense degree of agitation in the calcining zone. Such particles are not in close continuous contact, but on the contrary are subjected to continuous rolling and multiple impact agglomeration and accretion.

With the above and other objects and features in view, the invention consists in the improved contact material or catalyst carrier and process of making same which is hereinafter described and more particularly defined by the accompanying claims.

Diatomaceous earth of a grade suitable for preparing the spherular aggregate contact material of the present invention, should have a silica content of at least 84% and should contain not more than approximately 16% non-siliceous impurities (in the form of oxides or silicates of aluminum, iron, calcium, and magnesia) and added fluxing agents. In preparing the crude diatomaceous earth for use, the earth is first dried and may be then comminuted or milled and graded to have a particle size distribution as determined by the Oden sedimentation test method of 80–95% less than 6 microns.

The spherular aggregate of the present invention can be prepared from milled diatomaceous earth of approximately the particle-size distribution above indicated. A preferred product can be prepared from diatomaceous earth obtained as follows: The comminuted diatomaceous earth is suspended in an air stream and is passed through cyclones or over settling chambers for removal of the coarser and heavier particles. The very fine particles pass in part through the cyclones or over the settling chambers without deposition. These very finely-divided or air-separated particles may then be removed from the air stream by passing the stream through fabric bags or dust collectors in which the suspended particles are trapped. The finely-divided powder thus obtained is hereinafter referred to as "bag house grade diatomaceous earth," of which at least 80% is finer than 6 microns.

After comminution and after particle-size classification the finely-divided diatomaceous earth is in condition suitable for calcining and aggregation by the process of the present invention. Such calcining may be effected without the addition of any fluxing agent, provided the raw diatomaceous earth has sufficient non-siliceous impurities having fluxing properties to develop a fritting or fusion-bonding action for the finely-divided particles at the calcination temperatures employed, which are above 2000° F. In some instances, however, it may be desirable to add to the particles 3%–8% of a fluxing agent such as sodium carbonate, sodium borate, lead oxide, or magnesium or calcium oxides.

After thoroughly mixing the diatomaceous earth and any added fluxing agent, the thus formed mixture is charged at a controlled rate into one end of a rotary kiln, while rotating the kiln at a speed which is adjustable, for example, between ⅓ and 1½ revolutions per minute. A suitable kiln for this purpose may comprise a refractory lined cylinder or tube of high-temperature resistant construction having a length several times its diameter, as for example, a length of approximately 80 feet and a diameter of approximately 8 feet. This kiln is mounted to rotate throughout its length and is arranged with burners for direct or indirect firing to develop temperature of 2000° F.–2600° F. throughout the entire calcining operation. The kiln is preferably tilted away from the horizontal toward its discharge end to insure advance of the charge material longitudinally between the charge and the discharge ends at a rate which limits the time of sojourn of individual particles of diatomaceous earth within the calcining zone at the discharge end to a period of a very few minutes. It will be understood that the time of exposure of the diatomaceous earth particles to the high temperatures developed within the kiln can be controlled by the slope of the kiln, by the rate of rotation of the kiln, and by the rate at which the particles are charged to the kiln.

In a direct fired kiln of the dimensions specified, sintering and calcining of the charge normally takes place adjacent to the firing and discharge end of the kiln, after the charge material has been pre-heated during its advance through the kiln away from the charging end. A period of 30–90 minutes may be required for advancing the charge through the length of the kiln. A great part of this period is taken up in heating the charge to the calcining temperature. Following the period of gradual pre-heating of the charge to a temperature just below that at which incipient fusion of the non-siliceous fluxing agents develops, the charge is advanced in a comparatively thin bed of not more than 3"–4" maximum depth through the short calcining and agglomerating zone adjacent to the discharge end of the kiln, wherein the charge is maintained at calcining temperatures of 2000° F.–2200° F. for a short period, for example 5 to 10 minutes, before the product is discharged from the kiln.

One reason for providing a refractory lining for the kiln is to provide a rough surface of such frictional resistance as to inhibit sliding movement of the charge particles within the calcining zone at the temperature of incipient fusion for the fluxing agents. The charge particles, and the agglomerate granules built up therefrom, are subjected to rolling and to movement transversely as well as longitudinally of the kiln. As rotation of the kiln tends to lift the particles and granules away from the main body of the charge, multiple impacts take place between individual particles and between particles and formed aggregates, whereby the aggregates rapidly increase in size and are shaped by rolling accretion to ultimate spherular form. By varying the rate of rotation of the kiln, formation of agglomerate granules of suitable size takes place when the rate of charging the kiln is correspondingly varied between 1000 and 4000 lbs. per hour. When rotating the kiln at about 1 R. P. M. and controlling the rate of charging the kiln to about 2000–2500 lbs. of diatomaceous earth particles per hour, it is possible to so control the movement of the particles throughout the length of the kiln and the time of exposure to rolling and multiple impact agglomeration and accretion within the high temperature calcining zone of the kiln, as to build up hard and physically strong spherular aggregate granules of ½₀"–½" diameter within a very brief period of sojourn of the charged particles within the calcining zone.

The spherular aggregates which are discharged from the calcining zone have sufficient mechanical strength so that they may be readily cooled to normal temperature without the exercise of any particular precautions. The individual grains which make up the aggregate structure comprise finely-divided diatomaceous earth particles adhered together into aggregates by fritting, probably largely by the formation of silicates formed in situ by the fusion or partial fusion of the non-siliceous impurities, or added fluxes, in contact with the silica at the calcination temperatures.

The spherular granules vary considerably in color, density, and porosity, depending upon the amount of flux and time and temperatures of calcination treatment. The color generally ranges from a grayish white or light tan to a dark brown, as the calcination temperature increases from 2000 to 2600° F. The spherular granules may be produced to substantially uniform size, the average size ranging between ⅛ and ¼". The individual granules are highly porous and, at the same time, have a physical strength which resists disintegration or crushing by weights at least as heavy as 3–9 lbs. per granule of 3/16" diameter. Such physical strength and resistance to crushing may be still further increased up to 20 lbs. by a second calcination or recalcination treatment, effected without rolling and tumbling at a temperature in the neighborhood of 2200–2400° F. The once calcined granules apparently owe their high physical strength and retention of inherent diatom porosity to the formation of a silicate bond at the surface of the granules by reaction in situ of the fluxing material with the silica of the diatomaceous particles at temperatures of incipient fusion of the flux. Once formed, such bond remains essentially non-tacky at temperatures considerably above the firing temperatures employed in the primary calcining kiln. The shell of the once fired granule is harder and somewhat denser than the internal core, and the purpose of recalcining the granules at a higher temperature in a substantially stationary bed is to further harden and set this shell and to effect fusion of some of the uncombined fluxing material within the core portion of the granule underlying the shell. Size classification of the once calcined or recalcined granules may be effected by shaker screen methods.

The specific gravity of the calcined granules lies within the range 2.32–2.40. The apparent density of once-calcined granules is 0.5–0.9, and that of the recalcined granules is 0.9–1.4. The loose bulk density for the once-calcined particles is 14–30 lbs. per cubic foot; and of the recalcined particles, 30–45 lbs. per cubic foot. The temperature resistance of the once-calcined particles normally lies in the range 2200–2400° F.; and of the recalcined particles, 2400–2600° F. The once-calcined particles have a porosity factor for water absorption of 110–150 lbs. of water per hundred lbs. of aggregate. The recalcined particles have a porosity factor of 35–110 lbs. of water per hundred pounds of aggregate.

The spherular aggregates herein described possess a much higher porosity/density ratio than is possessed by any diatomaceous earth aggregate heretofore manufactured. For this reason the spherular granules have a wide and practical application as contact material and catalyst supports, even when the chemical reactions involved require frequent regeneration by means of high-temperature oxidation or strong solvent treatment. The particular efficiency of the spherular granules of the present invention is probably a resultant of the high silica content of such granules and of the structural strength imparted thereto without serious adverse effect on the diatom structure, by the high temperature calcination and rolling agglomeration treatment. Such calcination treatment, combined with the rolling and rapidly-repeated impact agglomeration of the particles, effects aggregation of the particles into strong spherular granules without substantial reduction of the porosity by excessive closure of pore spaces with fused, non-siliceous metal oxides or silicates. Recalcination, of course, has the effect of further sintering or slagging the non-siliceous bonding material and of thereby increasing the strength of the material at the expense of a reduction in porosity. An important factor in reducing the amount of sintering or slagging which takes place during the primary calcination treatment, is the limited time of exposure of the diatomaceous earth particles and fluxing agents to the high calcining temperatures following the longer period required to heat the charge to incipient sintering temperatures. By limiting this calcining time within the indicated period of a very few minutes, and by thereafter effecting rapid cooling of the aggregate granules discharged from the calcining zone, such sintering or fusion as does take place is only incipient in character and does not effect any serious closure or blocking of the pores in the granule structure.

Diatomaceous silica is, itself, a catalyst for many types of chemical reactions. The spherular aggregates, however, may incorporate in their structure other active catalytic or non-catalytic materials, such as, for example, oxides or salts of nickel or copper, or finely-divided metals such as platinum or palladium. Deposition of such added catalysts within the structure of the spherular aggregate may be made after formation of the aggregate; or during the process of preparing the diatomaceous earth for charging to the calcining muffle.

Since many variations may be made from the illustrative details given, without departing from the scope of the invention, it is intended that the invention should be limited only by the terms of the claims interpreted as broadly as consistent with novelty over the prior art.

What I claim is:

1. A siliceous contact material comprising spherular granules of aggregated calcined particles of diatomaceous earth impregnated with an active catalyst, at least 80% by weight of said particles being less than 6 microns in size, said particles being adhered together in aggregate granules by a silicate formed in situ, and said granules having a diameter of 1/20–½", a resistance against crush loads of 3–20 pounds for an average size granule of 3/16" diameter, and a resistance against structural changes at temperatures of 2200–2600° F.

2. A contact material as defined in claim 1, in which the aggregate granules have a resistance strength against crushing in the range of 10–20 pounds, and possess a mass density in the range 30–45 pounds per cubic foot.

3. A contact material comprising spherular granules of agglomerated particles of diatomaceous earth, at least 80% of said particles being less than 6 microns in size, said particles being adhered together by a silicate formed in situ, each of said granules having an outer shell which is harder and denser than the core, and said granules having a diameter of 1/20–½", a resistance against crushing loads of 3–9 pounds, and a resistance against structural change at temperatures up to 2400° F.

4. A contact material as defined in claim 3, in which the spherular granules average approximately ¼" in diameter and have a porosity factor of 110–150 pounds of water absorption per hundred pounds of granules.

5. In simultaneously calcining and agglomerating finely-divided diatomaceous earth particles of which at least 80% by weight are less than 6 microns in size, the steps comprising, charging said particles continuously into one end of a rotary kiln, advancing the charge rapidly through a calcining zone at the opposite discharge end of the kiln in a bed not exceeding 3 or 4 inches in thickness, maintaining the charge in the calcining zone at a temperature above 2000° F. for a period of not to exceed 5–10 minutes, and controlling the rate of rotation of the kiln and the rate of particle charging to the kiln to develop incipient sintering and simultaneous rolling and multiple impact agglomeration of the particles into spherular aggregates each having an outer shell which is harder and denser than its core, while avoiding substantial reduction of inherent diatom porosity.

6. The process of making spherular siliceous aggregate granules of 1/20–1/2" diameter and 14–30 pounds per cubic foot mass density which comprises, pre-heating diatomaceous earth particles admixed with a small amount of fluxing agent to a temperature just below that of incipient fusion, then advancing said charge continuously in a thin bed of not to exceed 3–4 inch thickness through a calcining zone while maintaining the charge therein at a temperature above 2000° F. at which incipient fusion develops and while simultaneously agitating and rolling said particles to effect multiple impact agglomeration thereof into aggregate granules, and discharging said granules from the calcining zone after limiting their time of sojourn therein to a period of 5–10 minutes.

7. The process of making spherular aggregate granules as defined in claim 5, together with the step of recalcining the granular product of the primary calcination treatment while holding such granules in a substantially stationary bed at a temperature of 2200–2600° F.

ARTHUR B. CUMMINS.

REFERENCES CITED

The following references are of record in the file of this patent:

UNITED STATES PATENTS

| Number | Name | Date |
|---|---|---|
| 1,503,133 | Ritchie | July 29, 1924 |
| 1,970,280 | Cummins | Aug. 14, 1934 |

FOREIGN PATENTS

| Number | Country | Date |
|---|---|---|
| 234,735 | Great Britain | May 28, 1925 |